United States Patent
Hohmann et al.

[15] 3,666,778
[45] May 30, 1972

[54] ANTHRAQUINONE DYESTUFFS

[72] Inventors: Walter Hohmann, Leverkusen; Hans-Samuel Bien, Burscheid, both of Germany

[73] Assignee: Farbenfabriken Bayer Aktiengesellschaft, Leverkusen, Germany

[22] Filed: June 20, 1969

[21] Appl. No.: 835,222

[30] Foreign Application Priority Data

June 29, 1968 Germany.....................P 17 68 789.7
June 29, 1968 Germany.....................P 17 68 788.6

[52] U.S. Cl..........................................260/376, 8/39, 8/40, 260/377, 260/378, 260/379, 260/381
[51] Int. Cl. ............................................................C09b 11/56
[58] Field of Search..................260/378, 379, 380, 376, 381

[56] References Cited

UNITED STATES PATENTS 2,434,765 1/1948 Grossmann...........................260/378

*Primary Examiner*—Lorraine A. Weinberger
*Assistant Examiner*—Robert Gerstl
*Attorney*—Plumley, Tyner & Sandt

[57] ABSTRACT

Dyestuffs of the formula

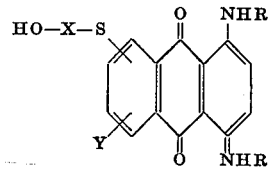

in which X is an optionally substituted alkylene radical;

R is an optionally substituted phenyl radical; and Y is H, Cl, Br or —S—X—OH have been prepared.

3 Claims, No Drawings

ANTHRAQUINONE DYESTUFFS

The subject-matter of the present invention comprises dyestuffs of the general formula

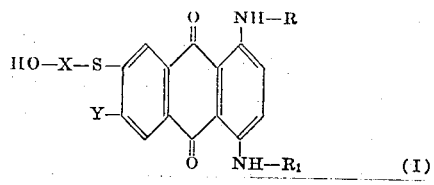

(I)

in which X stands for an alkylene radical which may be substituted by a hydroxyl group; R and $R_1$ stand for optionally substituted alkyl or cycloalkyl radicals; and Y stands for hydrogen, chlorine, bromine or —S—X—OH where X has the same meaning as above and the anthraquinone nucleus may contain further substituents, preferably halogen, and dyestuffs of the general formula

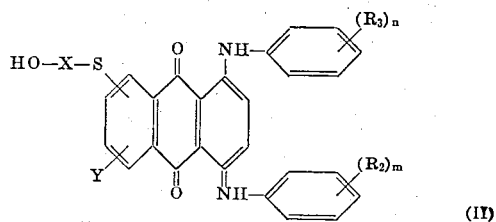

(II)

in which X stands for an alkylene radical which may be substituted by a hydroxyl group; $R_2$ and $R_3$ stand for hydrogen or a substituent; $n$ and $m$ mean the numbers 0 – 3; and Y stands for hydrogen, chlorine, bromine or the radical —S—X—OH where X has the same meaning as above and the anthraquinone nucleus may contain further substituents, especially chlorine or bromine, as well as the production and application thereof.

Suitable radicals X are primarily straight-chain or branched alkylene radicals with one to six carbon atoms, for example, ethylene, propylene, 2-hydroxy-propylene and isobutylene radicals.

Examples of alkyl radicals R and $R_1$ are primarily alkyl radicals with one to eight carbon atoms, which may be substituted, such as methyl, ethyl, n-, iso-propyl, n-, iso-,tert.-butyl, n-, iso-pentyl, 2-hydroxy-ethyl, 3-methoxypropyl, benzyl, phenyl-$\alpha$ or -$\beta$-ethyl, 1-phenyl-5-methyl-hexylene-(3), hexahydrobenzyl, $\gamma$-dimethyl-amino-propylenamino, $\beta$-aminoethyl, $\gamma$-aminopropyl, $\beta$-acetaminoethyl radicals.

The cycloalkyl radicals are preferably cyclohexyl radicals which may contain one or more of the substituents customary in anthraquinone chemistry, such as optionally substituted alkyl radicals, preferably those with one to four carbon atoms. for example, methyl, ethyl, n-, iso-propyl, n-, iso-or tert.-butyl radicals; optionally alkylated hydroxyl or amino groups, such as the hydroxyl, methoxy, amino, or acetylamino group.

The radicals R and $R_1$ or $R_2$ and $R_3$ may be identical or different.

Suitable substituents $R_2$ and $R_3$ are those customary in anthraquinone chemistry, such as alkyl radicals, preferably lower alkyl radicals with one to six carbon atoms, such as methyl, ethyl, n-, iso- and tert.-butyl, n-, iso-pentyl, hydroxyethyl radicals; alkoxy radicals, preferably alkoxy radicals with one to four carbon atoms, which may be substituted, such as methoxy, ethoxy, propoxy, 2-hydroxyethoxy, 3-hydroxypropoxy, 2-methoxy-ethoxy radicals; alkylmercapto radicals, preferably those with one to four carbon atoms such as methylmercapto, ethylmercapto-radicals; halogen atoms such as fluorine, chlorine or bromine; amino groups which may in turn be substituted by alkyl, acyl or cycloalkyl radicals such as amino, methylamino, dimethylamino, cyclohexylamino, acetylamino, propionylamino, butyrylamino, acetylmethylamino, $\beta$-hydroxyethylamino, $\beta$-hydroxyacetylamino, $\beta$-methoxyacetylamino groups; hydroxyl groups.

Suitable dyestuffs (II) are, for example, those of the formula

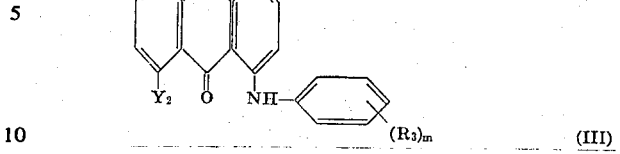

(III)

in which $Y_1$ and $Y_2$ stand for hydrogen, chlorine, bromine or —S—X—OH but cannot simultaneously denote hydrogen, chlorine or bromine, as well as those of the formula

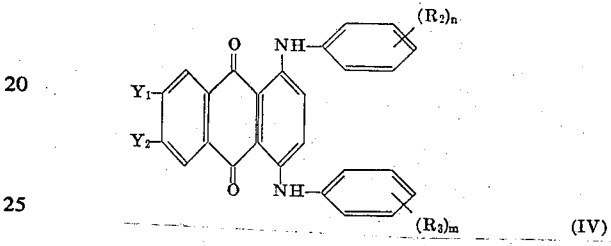

(IV)

in which $Y_1$ and $Y_2$ as well as $R_2$, $R_3$, $n$ and $m$ have the same meaning as above.

Examples of dyestuffs (I) according to the invention are the anthraquinones mentioned in the following, which are substituted in the 6- or 7-position, or in the 6,7-position by $\beta$-hydroxyethyl-thio, $\beta\gamma$-dihydroxypropyl-thio, $\gamma$-hydroxypropyl-thio, $\alpha$-methyl-$\gamma$-hydroxypropyl-thio groups, or in the 6(7)-position by one of the aforesaid hydroxyalkyl thio groups and in the 7(6)-position by chlorine or bromine: 1,4-di-cyclohexylamino-, 1,4-di-o-, m-, p-methyl-cyclohexyl-amino-, 1,4-di-ethyl-cyclohexylamino-, 1,4-di-n-, iso-propyl-cyclohexylamino, 1,4-di-p-tert.-butyl-cyclohexylamino, 1,4-di-o-, m-, p-hydroxy-cyclohexylamino-, 1,4-di-m-, p-amino-cyclohexylamino-, 1,4-di-m-, p-acetamino-cyclohexylamino-, 1-cyclohexylamino-4-o-, m-, p-methyl-cyclohexylamino-, 1-cyclohexylamino-4-o-, m-, p-hydroxy-cyclohexylamino-, 1-cyclohexylamino-4-m-, p-amino, or -acetamino-cyclohexyl-amino-, 1-o-, m-, p-methyl-cyclohexylamino-4-m-, p-hydroxy-,-amino- or -acetamino-cyclohexylamino-, 1-cyclohexylamino-4-hexahydro-benzylamino-, 1-cyclohexylamino-4-benzylamino-, 1-cyclohexaylamino-4-phenyl-$\alpha$- or -$\beta$-ethylamino-, 1-cyclo-hexylamino-4-n- or -iso-propylamino 1-o-, m-, p-methyl-cyclohexylamino-4-n- or -iso-propylamino-, 1,4-di-methyl-amino-, 1,4-di-n-, iso-propylamino-, 1-n(iso)-propylamino-4-iso(n)-propylamino-, 1,4-di-benzylamino-, 1,4-di-hexahydro-benzylamino-, 1,4-di-$\alpha$- or $\beta$-phenylethylamino-, 1,4-di-n-, iso-, tert.-butylamino-, 1,4-di-[1-phenyl-5-methyl-hexylen-amino(3)]-, 1,4-di-$\beta$-hydroxyethylamino-, 1,4-di-$\beta$-methoxy-ethylamino-, 1,4-di-$\beta$-ethoxyethylamino-, 1,4-di-$\gamma$-dimethyl-amino-propylenamino-, 1,4-di-$\beta$-amino-ethylamino-, 1,4-di-$\beta$-acetamino-ethylamino-, 1-isopropylamino-4-$\beta$-hydroxy-ethyl-amino-anthraquinone.

Examples of dyestuffs (II) according to the invention are anthraquinones which are substituted in the 5-or 6position or in the 5,8- or 6,7-position by $\beta$-hydroxy-ethyl-thio, $\beta,\gamma$-dihydroxypropyl-thio, $\gamma$-hydroxypropyl-thio, $\alpha$-methyl-$\gamma$-hydroxypropyl-thio groups, or in the 5(8)- or 6(7)-position by a $\beta$-hydroxyethyl-thio, $\beta$, $\gamma$-hydroxypropyl-thio, $\gamma$-hydroxypropyl-thio, $\alpha$-methyl-$\gamma$-hydroxypropyl-thio group and in the 8(5)- or 7(6)-position by chlorine or bromine, such as 1,4-di-o-, m-, p-anisidino-; 1,4-di-o-, m-, p-toluidino-; 1,4-di-anilino-; 1,4-di-o-, m-, p-chloro-anilino-; 1,4-di-o-, m-, p-bromo-anilino-; 1,4-di-m, p-fluoro-anilino-; 1,4-di-o-, m-, p-phenetidino-; 1,4-di-o-, m-, p-hydroxy-anilino-; 1,4-di-m-, p-hydroxyethoxy-anilino-; 1,4-di-o-, m-, p-amino-anilino-; 1,4-di-o-, m-, p-acetamino-anilino-; 1,4-di-o-, m-, p-hydroxy-acetamino-anilino-; 1,4-di-m, p-hydroxyethyl-amino-anilino-; 1,4-di-m-, p-[n-, iso-, tert.]-butyl-anilino-; 1,4-di-m-, p-carbomethoxy-anilino-; 1,4-di-carbethoxy-anilino-; 1,4-di-m-, p-methylthio-anilino 1,4-di-[2,3-; 2,4-; 2,5-; 2,6-; 3,4-; 3,5-di-methyl ]- anilino-; 1,4-di-[2,4,6-; 2,3,4-; 2,4,5,-tri-methyl]-anilino-; 1,4-di-[2,6-di-ethyl-4-methyl]-anilino-; 1,4di-]3-methyl-4-hydroxy or 4- methyl-3-hydroxy]-anilino-; 1,4-di-]3-(4)-methyl-4-(3)-methoxy]-anilino-; 1,4-di-[3-chloro-4-methyl or methoxy]-anilino-; 1,4-di-[3-methyl or chloro-4-acetamino]-anilino-; 1,4-di-p-cyclohexyl-anilino-; 1-anilino-4-o-, m-, p-anisidino-; 1-anisidino-4-o-, m-, p-anisidino-; 1-o-, m-, p-anisidino-4-o-, m-, p-toluidino-; 1-anilino-4-o-, m-, p-toluidino-; 1-anilino-4-o-, m-, p-acetamino-anilino-; 1-0-, m-, p-toluindino-4-o-, m-, p-acetamino-anilino-; 1-o-, m-, p-anisidino-4-o-, m-, p-acetamino-anilino-; 1anilino-4-o-, m-, p-hydroxy-anilino-; 1-[2,3-; 2,4-; 2,5-; 2,6-; 3,4-; 3,5-dimethyl]-anilino-4-o-, m-, p-toluidino or -anisidino-; 1-o-, m-, p-toluidino-4-[p-acetamino-phenyl]-anilino- anthraquinone.

If two radicals HO—X—S are present, these may be identical or different.

Dyestuffs of the general formula (I) can be obtained from compounds of the general formula

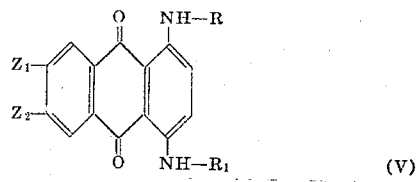

(V)

in which $Z_1$ and $Z_2$ stand for hydrogen, chlorine or bromine, but cannot simultaneously denote hydrogen, by the exchange of one or two halogen atoms for the radical —S—X—OH with thiols HS—X—OH. If $Z_1$ and $Z_2$ stand for halogen, one or two halogen atoms may be exchanged. In the case where different mercaptans are used, final dyestuffs with different thioether groups —S—X—OH can be obtained by the exchange of two halogen atoms.

Suitable thiols are, for example

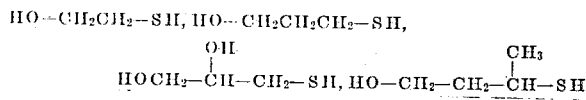

The halogen exchange is preferably carried out in an organic solvent, for example, in methanol, ethanol, butanol, isopropanol, N-methyl-pyrrolidone, ε-caprolactam, pyridine, chlorobenzenes, glycol ethers, but preferably in dimethyl formamide. The reaction can be carried out at room temperature as well as at an elevated temperature, for example, at temperatures of 20°–200° C, preferably at 60° – 130° C. It may take place in the presence of acid-binding agents, for example, in the presence of alkali metal carbonates, alkali metal alcoholates, alkali metal hydroxides, and/or tertiary amines, for example, triethylamine, triethanolamine or N-methyl-N,N-diethanolamine.

The products obtained by the exchange of halogen may be subsequently halogenated, for example, with chlorine or bromine or with the usual halogenating agents.

The compounds of the general formula (V) can be obtained either by the exchange of the α-positioned halogen atoms in compounds of the general formula (VI) or by the exchange of the hydroxyl groups in compounds of the general formula (VII)

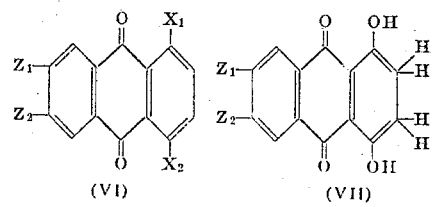

in which $Z_1$ and $Z_2$ have the same meaning as above, and $X_1$ and $X_2$ stand for chlorine or bromine, for optionally substituted alkyl- or cycloalkyl-amino radicals of the type mentioned above and, if desired, by subsequent oxidation of the leuco reaction products primarily formed from (VII).

In compounds of the formula (VI) or (VII), only one of the α-positioned substituents may initially be exchanged for an alkyl- or cycloalkyl-amino radical. When the intermediate products so prepared, which still contain a chlorine or bromine atom or a hydroxyl group in the 4-position are isolated and reacted in a second reaction step with another alkyl- or cycloalkyl-amine, then there are obtained anthraquinones which are substituted in the 1,4-position by different alkyl- and/or cycloalkyl-amino radicals.

Compounds which are essentially the same but usually contain more or less substantial proportions of the corresponding symmetrical 1,4-dialkyl- or cycloalkyl-amino-anthraquinone derivatives, can also be obtained in one reaction step, i.e. without isolation of the mono-reaction products, either by using the alkyl- or cycloalkyl-amine to be initially reacted only in a slight excess over the amount of amine theoretically required for the monosubstitution, optionally in the presence of a solvent, for example, nitrobenzene, the second reaction component being added and reacted only after the conversion is complete and, if necessary, at elevated temperatures, or by immediately reacting with a mixture of two alkyl- and/or cycloalkylamines.

The reactions are generally carried out at an elevated temperature, for example, at 100° – 200° C. when starting from (VI), at 50° – 130° C when starting from (VII), and optionally in the presence of an acid-binding agent, such as an alkali metal carbonate or acetate.

The reactions are preferably carried out in organic solvents, for example, in methanol, ethanol, isopropanol, butanol, isobutanol, glycol monomethyl ether, or in an excess of the reacting alkyl- or cycloalkylamines, or in mixtures of these solvents with water, preferably in the presence of boric acid when starting from (VII), and in butanol, glycol or diglycol ethers, dimethyl formamide, chlorobenzenes, nitrobenzene of in an excess of the reacted amines when starting from (VI).

The compounds (VII) can be prepared from the corresponding quinizarines by reduction according to processes known from the literature. Suitable reducing agents are for example, sodium dithionite, zinc dust/hydrochloric acid, aluminum powder/sulphuric acid, iron/glacial acetic acid, or the leuco compound of the anthraquinone derivatives used.

A variant of the process described above consists in that initially the substituents $Z_1$ and/or $Z_2$ in compounds of the formula

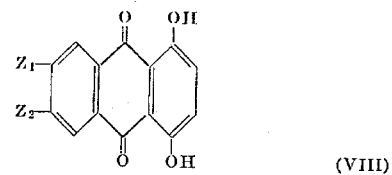

(VIII)

in which $Z_1$ and $Z_2$ have the same meaning as above, are exchanged for the radicals HO—X—S—; the reaction product of the formula

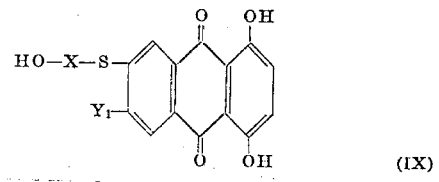

(IX)

in which $Y_1$ stands for hydrogen, halogen or HO—X—S—, is then reduced to form the corresponding leuco compound; the hydroxyl groups are then simultaneously or successively exchanged for identical or different alkyl- and/or cyclo-alkyl-amino radicals; and, if desired, the leuco reaction products are oxidized by methods known from the literature to form the corresponding anthraquinone derivatives. In general, however, this procedure offers no advantage over the processes described above.

The dyestuffs of the formula (II) can be obtained from compounds of the general formula

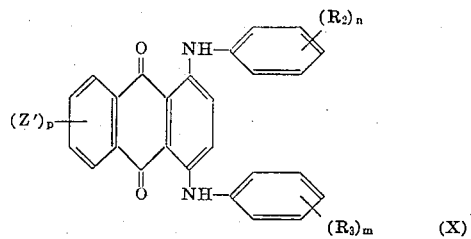

in which Z' stands for chlorine or bromine; p for the numbers 1 or 2; and $R_2$, $R_3$, $n$ and $m$ have the same meaning as above, by exchanging the substituent Z' for the radical —S—X—OH by the reaction with thiols HS—X—OH, one or two substituents being exchangeable, and optionally by subsequent chlorination or bromination. The use of different thiols leads to final dyestuffs with different radicals —S—X—OH.

The exchange of Z' for —S—X—OH is preferably carried out in an organic solvent, for example in methanol, ethanol, butanol, isopropanol, N-methyl-pyrrolidone, ε-caprolactam, pyridine, chlorobenzene, o-dichlorobenzene of glycol monomethyl ether, but preferably in dimethyl formamide. The reaction can be carried out at room temperature as well as at an elevated temperature, for example, at temperatures in the range from 20° to 200° C, preferably 60° – 130° C. It may take place in the presence of acid-binding agents, for example, in the presence of alkali metal carbonates, alkali metal alcoholates, alkali metal hydroxides, and/or tertiary amines, for example, triethylamine, triethylamine or N-methyl-N,N-diethanolamine.

The resultant products may be subsequently halogenated, for example, with chlorine or bromine or with the usual halogen-yielding agents.

The compounds of the formula (X) in which the substituent or substituents Z' stand in the β-position, can be obtained by the exchange of the α-positioned halogen atoms in compounds of the general formula

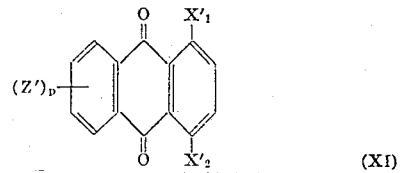

in which Z' and p have the same meaning as above, and $X_1'$ and $X_2'$ are identical or different and stand for chlorine or bromine, for arylamines of the formulae

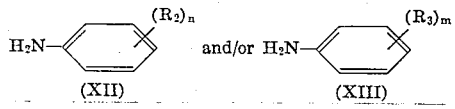

in which $R_2$, $R_3$, $n$ and $m$ have the same meaning as above. It is possible initially to exchange only one of the α-positioned halogen atoms for an arylamine radical. When the intermediate product so prepared, which still contains a halogen atom in the α-position, is isolated and reacted in a second operation with another arylamine then there are obtained di-arylamino-anthraquinone derivatives which carry different substituents in the 1,4-position.

Compounds which are essentially the same but usually contain small proportions of the corresponding diarylamino derivatives which are symmetrical in the 1,4-position, can also be obtained in one reaction, i.e. without isolation of the monosubstitution product, by either using the arylamine initially to be reacted only in a slight excess over the amount theoretically required, optionally in the presence of a solvent such as nitrobenzene, and adding and reacting the second reaction component only when this has been converted and, if desired, at elevated temperatures, or by immediately reacting with a mixture of two arylamines.

The reactions are generally carried out at an elevated temperature, for example, at 120° – 220° C, and generally in the presence of an acid-binding agent, such as an alkali metal carbonate or acetate, optionally with the addition of catalytic amounts of copper or its salts. Suitable solvents are, for example, butanol, glycol and diglycol ethers, dimethyl formamide, chlorobenzenes, nitrobenzene or, preferably, an excess of the reacting amines.

Compounds of the formula (X) in which the substituent or substituents Z' stand in the α- or β- position, can be obtained by the exchange of the OH groups in compounds of the general formula

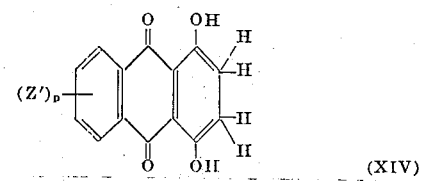

in which Z' and p have the same meaning as above, for arylamines of the formulae (XII) and (XIII). It is possible either first to prepare (XIV) by methods known form the literature, optionally isolating this compound and reacting it with arylamines, or to carry out the preparation of (XIV) from the corresponding quinizarines and the reaction with arylamines in a single reaction step. Here, too, it is possible to react simultaneously or successively with identical or different arylamines.

Suitable reducing agents for the preparation of the leuco compounds are, for example, sodium dithionite, zinc dust/hydrochloric acid, aluminum/sulphuric acid, iron/acetic acid, or the leuco compound of the anthraquinone derivative used.

The reaction is preferably carried out in organic solvents, for example, in methanol, ethanol, isopropanol, butanol, isobutanol, glycol monomethyl ether or in an excess of the reacting arylamine, or in mixtures of these solvents with water, preferably in the presence of boric acid. The reaction proceeds already at room temperature and is preferably carried out at an elevated temperature, for example, at 60° – 130° C.

A variant of the process described above consists in exchanging the substituent or substituents Z' in compounds of the formula XV

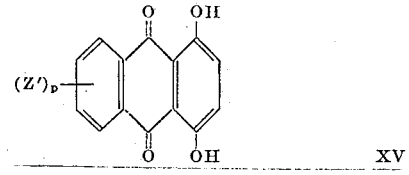

in which Z' and p have the same meaning as above, for the radical —S—X—OH, and subsequently exchanging the hydroxyl groups for arylamine radicals, possibly after etherification of the hydroxyl groups or reduction of the reaction product to form the leuco compound. In general, however, this procedure offers not advantages.

The new dyestuffs are finely divided in the usual way, for example, by pasting with sulphuric acid or an organic solvent. They are suitable for dyeing and printing synthetic fiber materials, especially those of synthetic polyamides, for example, those of poly-ε-caprolactam or of condensation products from hexamethylene-diamine and adipic acid. The greenish blue to blue dyeings obtained are generally characterized by great clarity and good general fastness properties, particularly by good fastness to light and washing.

The parts given in Examples are parts by weight, unless otherwise stated; the temperatures are degrees Centigrade.

EXAMPLE 1 a. 100 parts 1,4-dicyclohexylamino-6-chloro-anthraquinone are suspended in 100 parts dimethyl formamide at 115° – 120° and mixed with 30 minutes with a solution of 25,2 parts thioglycol and 18.4 parts potassium hydroxide in 25.2 parts methanol. The reaction mixture is stirred at 110° for 20 minutes, poured onto 1,000 parts of ice water, some concentrated hydrochloric acid is added to improve the filtering property, the product is filtered off with suction, washed neutral, and dried. 109 Parts 1,4-di-cyclohexylamino-6-hydroxyethyl-mercapto-anthraquninone of good quality are obtained.

Since under the reaction conditions the solubility of 1,4-dicyclohexylamino-6-chloro-anthraquninone in dimethyl formamide is limited, whereas that of the reaction product is not, it is advantageous to react the 1,4-di-cyclohexyl-amino-6-chloro-anthraquinone with the thioglycol in portions. With this method the reaction mixture remains readily stirrable throughout the whole of the reaction time.

b. The 1,4-di-cyclohexylamino-6-chloro-anthraquinone used in (a) can be obtained as follows, for example:

100 Parts 1,4,6-trichloro-anthraquinone (obtained by chlorination of anthraquinone-β-sulphonic acid in oleum according to German Pat. No. 216,071 and subsequent treatment with nascent chlorine according to German Pat. No. 214,714) and 500 parts cyclohexylamine are boiled under reflux for 5½ hours. The reaction mixture is diluted with 500 parts ethanol, the product which is precipitated in the form of blue needles is filtered off with suction while hot, washed with hot ethanol until the drainage liquid is clear blue, and finally thoroughly with hot water. After drying, there are obtained 89.5 parts.

EXAMPLE 2

If the 1,4-di-cyclohexylamino-6-chloro-anthraqunione is replaced in Example 1(a) with an equal stoichiometric amount of 1,4-di-cyclohexylamino-6-bromo-anthraquinone (obtainable in analogy with Example 1(b) from 1,4-dichloro-6-bromo-anthraquinone or 1,4,6-tribromo-anthraquinone), then the same reaction and working up also yields 1,4-di-cyclohexylamino-6-hydroxymethylmercapto-anthraquinone of good quality in an almost theoretical yield.

EXAMPLE 3 a. 50 parts 1,4-di-n-propylamino-6,7-dichloro-anthraquinone are dissolved in 250 parts dimethyl formamide and mixed within 10 minutes at 100° – 105° with a solution of 13 parts thioglycol and 9.4 parts potassium hydroxide in 13 parts by volume of methanol, and the reaction mixture is further stirred at the same temperature for 10 minutes. The mixture is diluted with 500 parts methanol, stirred for several hours while cooling with ice, the product is filtered off with suction ans successively washed with methanol and water. 41 parts 1,4-di-n-propylamine-6-hydroxyethylmercapto-7-chloro-anthraquinone are obtained.

b. The 1,4-di-n-propylamino-6,7-dichloro-anthraquinone use in (a) can be obtained as follows:

100 Parts leuco-6,7-dichloro-quinizarine (obtainable, for example, by treating 6,7-dichloro-quinizarine with aluminum powder in concentrated sulphuric acid at 50° – 55°), 300 parts n-propylamine, 1,000 parts by volume of ethanol and a solution of 10 parts of boric acid in 50 parts of water are boiled under reflux and with access of air for 5 hours. The reaction product which is precipitated when the mixture is stirred cold, if filtered off with suction when cold, washed with ethanol and water, and dried. 72 Parts are obtained.

EXAMPLE 4 a. 70 Parts 1,4-di-cyclohexylamino-6,7-dichloro-anthraquinone are stirred in 300 parts dimethyl formamide and mixed at 100° – 110° within 20 minutes with a solution of 16.5 parts thioglycol and 12 parts potassium hydroxide in 16.5 parts methanol. Stirring is continued at the same temperature for 30 minutes. The reaction mixture is diluted with 300 parts by volume of methanol, stirred cold, the precipitated reaction product is filtered off with suction in the cold, was methanol and hot water. After drying, there are obtained 59 parts 1,4-di-cyclo-hexylamino-6-hydroxyethylmercapto-7-chloro-anthraquinone. This product contains about 10 percent each of 1,4-di-cyclohexyl-amino-6,7-dichloro-anthraquinone and 1,4-di-cyclohexyl-amino-6,7-dihydroxyethylmercapto-anthraquinone.

b. 29 Parts of the product obtained according to (a) are dissolved in 120 parts dimethyl formamide and mixed at 100° – 105° within 10 minutes with a solution of 7.3 parts thioglycerol and 3.8 parts potassium hydroxide in 7.3 parts methanol. Stirring is continued at 105° for 30 minutes, the mixture is diluted with 120 parts methanol, stirred cold, the reaction product which is precipitated in the form of small needles is filtered off with suction and washed with methanol and cold water. 23 Parts 1,4-di-cyclohexylamino-6-hydroxyethylmercapto-7-β,γ-dihydroxy-propylmercapto-anthraquinone are obtained.

c. If the potassium salt of thioglycerol is replaced in (b) with an equal stoichiometric amount of the potassium salt of thioglycol, then the same procedure yields 1,4-di-cyclohexylamino-6,7-di-hydroxyethylmercapto-anthraquinone.

The same product can also be obtained by a simpler method according to the following single step process:

99 Parts 1,4-di-cyclohexylamino-6,7-dichloro-anthraquinone are stirred at 100° – 110° into 500 parts dimethyl formamide, and the suspension is mixed within 20 minutes with a solution of 35 parts thioglycol and 25.5 parts potassium hydroxide in 35 parts methanol. The mixture is dilutes with 200 parts methanol, stirred cold, the product is filtered off with suction and successively washed with methanol and hot water. 94 Parts are obtained after drying.

d. A product similar to that of (b) is obtained when 47 parts 1,4-di-cyclohexylamino-6,7-dichloro-anthraquinone in 170 parts dimethyl formamide are mixed at 100° – 110° with a solution of 9.75 parts thioglycol, 13.5 parts thio-glycerol and 14 parts potassium hydroxide in 25 parts methanol, the mixture is diluted with 170 parts methanol and worked up as described under (b). The product contains higher proportions of 1,4-di-cyclohexylamino-6,7-di-hydroxyethylmercapto- and 1,4-di-cyclohexylamino-6,7-di-β,γ-dihydroxypropylmercapto-anthraquinone as impurities than the reaction product obtained according to (b).

e. The 1,4-di-cyclohexylamino-6,7-dichloro-anthraquinone used in the Examples 4(a) – (d) can be obtained as follows:

100 Parts 1,4,6,7-tetrachloro-anthraquinone are boiled under reflux with 500 parts cyclohexylamine for 1½ hours, and the mixture is diluted with 250 parts by volume of ethanol. The precipitated product is filtered off with suction while warm, washed with hot ethanol, boiled with dilute hydrochloric acid, washed until neutral, and dried. 72 Parts of pure product are obtained.

EXAMPLE 5 a. 10 Parts 1,4-di-cyclohexylamino-6-chloro-anthraquinone are dissolved in 50 parts dimethyl formamide and the solution is mixed at 115° – 120° within 10 minutes with a solution of 3.75 parts thioglycerol and 1.95 parts potassium hydroxide in 10 parts methanol. The reaction is allowed to continue at the same temperature for 30 minutes, the mixture is diluted at 30° – 40° with 50 parts by volume of ethanol, the product is filtered off with suction and successively washed with ethanol at 40° and with hot water. After drying, there are obtained 8.1 parts 1,4-di-cyclohexylamino-6-β,γ-dihydroxypropyl-mercapto-anthraquinone.

b. The 1,4-di-cyclohexylamino-6-chloro-anthraquinone used in (a) can be obtained as follows:

7.7 Parts leuco-6-chloro-quinizarine (obtainable, for example, from 6-chloro-quinizarine by treatment with aluminum powder in concentrated sulphuric a at 55°) are boiled under reflux for 4 hours with 30 parts cyclo-hexylamine, 80 parts ethanol and a solution of 1 part boric acid in 6 parts of water. The product is filtered off with suction at 50° washed with warm ethanol and water. 5.7 Parts are obtained.

The reaction products B of Table I can be obtained by the methods described in Examples 1 – 4 from the starting compounds A by reaction with thioglycol. The shades given in the last column refer to polyamide dyeings obtained according to the dyeing instruction of Example 65.

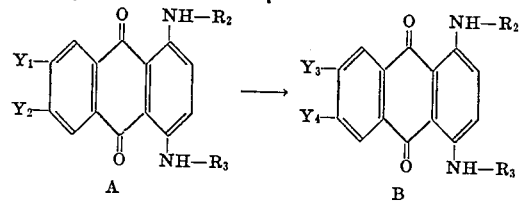

TABLE I

| Example | A | | | | | B | | | | | Shade |
|---|---|---|---|---|---|---|---|---|---|---|---|
| | $R_2$ | $R_3$ | $Y_1$ | $Y_2$ | $R_2$ | $R_3$ | $Y_3$ | $Y_4$ | | | |
| 6 | H—⌬—OH | H—⌬—OH | Cl | H | H—⌬—OH | H—⌬—OH | —S—CH$_2$—CH$_2$—OH | H | | | Greenish blue. |
| 7 | Same | Same | Cl | Cl | Same | Same | —S—CH$_2$—CH$_2$—OH | Cl | | | Do. |
| 8 | do | do | Cl | Cl | do | do | —S—CH$_2$—CH$_2$—OH | —S—CH$_2$—CH$_2$—OH | | | Blue. |
| 9 | H—⌬(CH$_3$)—CH$_3$ | H—⌬(CH$_3$)—CH$_3$ | Cl | H | H—⌬—CH$_3$ | H—⌬—CH$_3$ | —S—CH$_2$—CH$_2$—OH | H | | | Greenish blue. |
| 10 | Same | Same | Cl | Cl | Same | Same | —S—CH$_2$—CH$_2$—OH | Cl | | | Do. |
| 11 | do | do | Cl | Cl | do | do | —S—CH$_2$—CH$_2$—OH | —S—CH$_2$—CH$_2$—OH | | | Blue. |
| 12 | H—⌬—CH$_3$ | H—⌬—CH$_3$ | Cl | H | H—⌬—CH$_3$ | H—⌬—CH$_3$ | —S—CH$_2$—CH$_2$—OH | H | | | Greenish blue. |
| 13 | Same | Same | Br | Br | Same | Same | —S—CH$_2$—CH$_2$—OH | Br | | | Do. |
| 14 | H—⌬(H$_3$C)— | H—⌬(H$_3$C)— | Cl | H | H—⌬(H$_3$C)— | H—⌬(H$_3$C)— | —S—CH$_2$—CH$_2$—OH | H | | | Blue. |

TABLE I—Continued

| Example | R₂ | R₃ | A | Y₁ | Y₂ | R₂ | R₃ | B | Y₃ | Y₄ | Shade |
|---|---|---|---|---|---|---|---|---|---|---|---|
| 15 | —C(CH₃)₂—CH₃ (phenyl, H) | H (phenyl) | | Cl | H | —C(CH₃)₂—CH₃ (phenyl, H) | H (phenyl) | | —S-CH₂-CH₂-OH | H | Do. |
| 16 | —NH₂ (phenyl, H) | H (phenyl) | | Cl | H | —NH₂ (phenyl, H) | H (phenyl) | | —S-CH₂-CH₂-OH | H | Do. |
| 17 | Same | Same | | Cl | Cl | Same | Same | | —S-CH₂-CH₂-OH | Cl | Do. |
| 18 | —NH—CO—CH₃ (phenyl, H) | —NHCOCH₃ (phenyl, H) | | Cl | H | —NHCOCH₃ (phenyl, H) | —NHCOCH₃ (phenyl, H) | | —S-CH₂-CH₂-OH | H | Greenish blue. |
| 19 | H₂C—(phenyl, H) | H₂C—(phenyl, H) | | Cl | H | H₂C—(phenyl, H) | H₂C—(phenyl, CH₃) | | —S-CH₂-CH₂-OH | H | Greenish blue. |
| 20 | CH₃ (phenyl, H) | CH₃ (phenyl, H) | | Cl | H | CH₃ (phenyl, H) | CH₃ (phenyl, H) | | —S-CH₂-CH₂-OH | H | Do. |
| 21 | OH (phenyl, H) | H (phenyl) | | Cl | H | H (phenyl) | H (phenyl) | | —S-CH₂-CH₂-OH | H | Do. |
| 22 | Same | Same | | Cl | H | Same | Same | | —S-CH₂-CH₂-OH | H | Blue. |
| 23 | | —CH(CH₃)CH₃ | | Cl | H | —CH₂CH₃ | —CH(CH₃)CH₃ | | —S-CH₂-CH₂-OH | H | Do. |
| 24 | —CH₂CH₂CH₃ | H (phenyl, CH₃) | | Cl | H | —CH₂CH₃ | H (phenyl, CH₃) | | —S-CH₂-CH₂-OH | H | Do. |
| 25 | —CH(CH₃)CH₃ | —CH(CH₃)CH₃ | | Cl | Cl | —CH(CH₃)CH₃ | —CH(CH₃)CH₃ | | —S-CH₂-CH₂-OH | H | Do. |
| 26 | —CH(CH₃)CH₃ | —CH(CH₃)CH₃ | | Cl | Cl | —CH(CH₃)CH₃ | —CH(CH₃)CH₃ | | —S-CH₂-CH₂-OH | Cl | Somewhat greenish blue. |
| 27 | —CH(CH₃)CH₃ | —CH(CH₃)CH₃ | | Cl | H | —CH(CH₃)CH₃ | —CH(CH₃)CH₃ | | —S-CH₂-CH₂-OH | —S-CH₂-CH₂-OH | Blue. |
| 28 | —CH₂CH₂CH₃ | —CH₂CH₂CH₃ | | Cl | H | —CH₂CH₂CH₃ | —CH₂CH₂CH₃ | | —S-CH₂OH | H | Do. |
| 29 | —CH₂CH₂CH₃ | —CH₂CH₂CH₃ | | Br | Br | —CH₂CH₂CH₃ | —CH₂CH₂CH₃ | | —S-CH₂-CH₂-OH | —S-CH₂CH₂-OH | Reddish blue. |

TABLE I—Continued

| Example | A | | | | | B | | | | Shade |
|---|---|---|---|---|---|---|---|---|---|---|
| | R₂ | R₃ | Y₁ | Y₂ | R₂ | R₃ | Y₃ | Y₄ | | |
| 30 | —CH₂CH₂OH | —CH₂CH₂OH | Cl | H | —CH₂CH₂OH | —CH₂CH₂OH | | —S—CH₂—CH₂—OH | H | Greenish blue. |
| 31 | —CH₂CH₂OH | —CH₂CH₂OH | Cl | Cl | —CH₂CH₂OH | —CH₂CH₂OH | | —S—CH₂—CH₂—OH | Cl | Do. |
| 32 | —CH₂CH₂OH | —CH₂CH₂OH | Cl | Cl | —CH₂CH₂OH | —CH₂CH₂OH | | —S—CH₂—CH₂—OH | —S—CH₂CH₂—OH | Blue. |
| 33 | —CH₃ | —CH₃ | Cl | H | —CH₃ | —CH₃ | | —S—CH₂—CH₂—OH | H | Do. |
| 34 | —CH(CH₃)—CH(CH₃)₂ | —CH(CH₃)—CH(CH₃)₂ | Cl | H | —CH(CH₃)—CH(CH₃)₂ | —CH(CH₃)—CH(CH₃)₂ | | —S—CH₂—CH₂—OH | H | Greenish blue. |
| 35 | —CH₂CH₂CH₃ | —CH₂CH₂CH₃ | Cl | H | —CH₂CH₂CH₃ | —CH₂CH₂CH₃ | | —S—CH₂—CH₂—OH | H | Somewhat greenish blue. |
| 36 | —CH₂—C₆H₅ | —CH₃ | Cl | H | —CH₂—C₆H₅ | —CH₃ | | —S—CH₂—CH₂—OH | H | Do. |
| 37 | —CH(CH₃)—C₆H₅ | —CH(CH₃)—C₆H₅ | Cl | H | —CH(CH₃)—C₆H₅ | —CH(CH₃)—C₆H₅ | | —S—CH₂—CH₂—OH | H | Do. |
| 38 | —CH₂CH₂—C₆H₅ | —CH₂CH₂—C₆H₅ | Cl | H | —CH₂CH₂—C₆H₅ | —CH₂CH₂—C₆H₅ | | —S—CH₂—CH₂—OH | H | Do. |
| 39 | —CH(CH₂CH(CH₃)₂)(CH₃) | —CH(CH₂CH(CH₃)₂)(CH₃) | Cl | Cl | —CH(CH₂CH(CH₃)₂)(CH₃) | —CH(CH₂CH(CH₃)₂)(CH₃) | | —S—CH₂—CH₂—OH | Cl | Do. |
| 40 | —CH(CH₃)₂ | —CH(CH₃)₂ | —SCH₂CHCH₂OH(OH) | —SCH₂CHCH₂OH(OH) | —CH(CH₃)₂ | —CH(CH₃)₂ | | —SCH₂CHCH₂OH(OH) | —SCH₂CH₂OH | Do. |

The reaction products B of Table II can be obtained by the method described in Example 5 from the starting compounds A by reaction with thioglycerol. The shades given in the last column refer to polyamide dyeings obtained according to the dyeing instruction of Example 66.

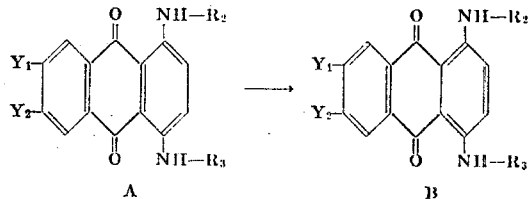

TABLE II

| Example | A | | | | | B | | | | | Shade |
|---|---|---|---|---|---|---|---|---|---|---|---|
| | $R_2$ | $R_3$ | $Y_1$ | $Y_2$ | | $R_2$ | $R_3$ | $Y_3$ | $Y_4$ | | |
| 41 | ⬡H | ⬡H | Cl | Cl | | ⬡H | ⬡H | $-S-CH_2CHCH_2OH$, $-OH$ | Cl | | Greenish blue. |
| 42 | Same | Same | Cl | Cl | | Same | Same | $-S-CH_2CHCH_2OH$, $-OH$ | $-S-CH_2CHCH_2OH$, $-OH$ | | Blue. |
| 43 | ⬡H(-OH) | ⬡H(-OH) | Cl | H | | ⬡H(-OH) | ⬡H(-OH) | $-S-CH_2CHCH_2OH$, $-OH$ | H | | Greenish blue. |
| 44 | Same | Same | Cl | H | | Same | Same | $-S-CH_2CHCH_2OH$, $-OH$ | Cl | | Blue. |
| 45 | ⬡H(CH_3) | ⬡H(CH_3) | Cl | Cl | | ⬡H(CH_3) | ⬡H(CH_3) | $-S-CH_2CHCH_2OH$, $-OH$ | H | | Greenish blue. |
| 46 | do | do | Cl | Cl | | Same | Same | $-S-CH_2CHCH_2OH$, $-OH$ | Cl | | Do. |
| 47 | do | do | Br | Br | | do | do | $-S-CH_2CHCH_2OH$, $-OH$ | Br | | Do. |

TABLE II – Continued

| Example | A | | | | B | | | Shade |
|---|---|---|---|---|---|---|---|---|
| | $R_2$ | $R_3$ | $Y_1$ | $Y_2$ | $R_2$ | $R_3$ | $Y_3$ | $Y_4$ | |
| 48 | phenyl-4-CH$_3$ (H at 2) | phenyl-4-CH$_3$ (H at 2) | Cl | | H | phenyl-4-CH$_3$ (H at 2) | phenyl-4-CH$_3$ (H at 2) | $-S-CH_2CHCH_2OH$ with $-OH$ | H | Do. |
| 49 | phenyl-4-C(CH$_3$)$_3$ (H at 2) | phenyl-4-C(CH$_3$)$_3$ (H at 2) | Cl | | H | phenyl-4-C(CH$_3$)$_3$ (H at 2) | phenyl-4-C(CH$_3$)$_3$ (H at 2) | $-S-CH_2CHCH_2OH$ / OH | H | Do. |
| 50 | phenyl-4-NH$_2$ (H at 2) | phenyl-4-NH$_2$ (H at 2) | Cl | | H | phenyl-4-NH$_2$ (H at 2) | phenyl-4-NH$_2$ (H at 2) | $-S-CH_2CHCH_2OH$ / OH | H | Do. |
| 51 | phenyl-2-CH$_2$- (H at 4) | phenyl-2-CH$_2$- (H at 4) | Cl | | H | phenyl-2-CH$_2$- (H at 4) | phenyl-2-CH$_2$- (H at 4) | $-S-CH_2CHCH_2OH$ / OH | H | Blue. |
| 52 | phenyl-2-CH$_3$ (H at 4) | phenyl-2-CH$_3$ (H at 4) | Cl | | H | phenyl-2-CH$_3$ (H at 4) | phenyl-2-CH$_3$ (H at 4) | $-S-CH_2CHCH_2OH$ / OH | H | Greenish blue. |
| 53 | phenyl (H) | phenyl (H) | Cl | | Cl | phenyl (H) | phenyl (H) | $-S-CH_2CHCH_2OH$ / OH | Cl | Greenish blue. |
| 54 | $-CH_2CH_2CH_3$ | $-CH_2CH_2CH_3$ | Cl | | H | $-CH_2CH_2CH_3$ | $-CH_2CH_2CH_3$ | $-S-CH_2CHCH_2OH$ / OH | H | Somewhat greenish blue. |
| 55 | $-CH(CH_3)CH_3$ | $-CH(CH_3)CH_3$ | Cl | | H | $-CH(CH_3)CH_3$ | $-CH(CH_3)CH_3$ | $-S-CH_2CHCH_2OH$ / OH | H | Do. |
| 56 | $-CH(CH_3)CH_3$ | $-CH(CH_3)CH_3$ | Cl | | Cl | $-CH(CH_3)CH_3$ | $-CH(CH_3)CH_3$ | $-S-CH_2CHCH_2OH$ / OH | Cl | Do. |
| 57 | $-CH(CH_3)CH_3$ | $-CH(CH_3)CH_3$ | Cl | | Cl | $-CH(CH_3)CH_3$ | $-CH(CH_3)CH_3$ | $-S-CH_2CHCH_2OH$ / OH | H | Blue. |
| 58 | $-CH_2CH_2CH_3$ | $-CH_2CH_2CH_3$ | Cl | | H | $-CH_2CH_2CH_3$ | $-CH_2CH_2CH_3$ | $-S-CH_2CHCH_2OH$ / OH | H | Do. |
| 59 | $-CH_2CH_2-OH$ | $-CH_2CH_2-OH$ | Cl | | H | $-CH_2CH_2-OH$ | $-CH_2CH_2-OH$ | $-S-CH_2CHCH_2OH$ / OH | H | Greenish blue. |
| 60 | $-C(CH_3)_3$ | $-C(CH_3)_3$ | Cl | | H | $-C(CH_3)_3$ | $-C(CH_3)_3$ | $-S-CH_2CHCH_2OH$ / OH | H | Do. |

TABLE II—Continued

| Example | R₂ | Y₁ | Y₂ | R₃ | R₃ | Y₃ | Y₄ | Shade |
|---|---|---|---|---|---|---|---|---|
| 61 | —CH₂CH₂CH₃ | Cl | H | —CH₂CH₂CH₃ | —CH₂CH₂CH₃ | —S—CH₂CHCH₂OH<br>OH | H | Blue |
| 62 | —CH₂CH₂CH₃ | Cl | H | —CH₂—CH(CH₃)(CH₃) | —CH₂—CH(CH₃)(CH₃) | —S—CH₂CHCH₂OH<br>OH | H | Do. |
| 63 | —CH₂CH₂CH₃ | Cl | Cl | —CH₂—C₆H₅ | —CH₂—C₆H₅ | —S—CH₂CHCH₂OH<br>OH | Cl | Do. |
| 64 | —CH₂CH₂CH₃ | —SCH₂CH₂OH | Cl | —CH₂CH₂CH₃ | —CH₂CH₂CH₃ | —SCH₂CH₂OH | —S—CH₂CHCH₂OH<br>OH | Do. |

EXAMPLE 65

10 Parts by weight of a fabric of synthetic polyamide in a bath containing 400 parts of water, 0.2 parts 1,4-di-cyclohexylamino-6-hydroxyethylmercapto-anthraquinone (obtained according to Example 1) in finely divided form and 0.2 parts of a conventional dispersing agent, are slowly heated to boiling temperature and dyed at the boil for 1 hour. The material is subsequently rinsed, slightly soaped, if desired, and dried. A very clear greenish blue dyeing of very good fastness to washing, light and rubbing is obtained.

EXAMPLE 66

A printing paste is prepared from 10 parts 1,4-di-n-propylamino-6-hydroxyethylmercapto-7-chloro-anthraquinone (obtained according to Example 2) in finely divided form, 30 parts Glyecin A = thiodiethylene glycol, 50 parts urea, 500 parts of a 12 percent carob bean flour ether thickening, and made up with water to 1,000 parts.

This printing paste is applied to a fabric of synthetic polyamide according to known processes by machine or screen printing, the fabric is dried, steamed in a Mather-Platt apparatus at 102° for 10 minutes, subsequently rinsed in the usual way and soaped. A clear blue print of very good fastness to washing, light and rubbing is obtained.

EXAMPLE 67

If the 1,4-di-cyclohexylamino-6-hydroxyethyl-mercapto-anthraquinone in Example 65 or the 1,4-di-n-propyl-amino-6-hydroxyethylmercapto-anthraquinone in Example 66 is replaced with equal parts of the products obtainable according to Examples 3 – 5, then clear blue prints or dyeings are likewise obtained.

In the same way the dyestuffs of Examples 6–64 yield dyeings and prints of the shades indicated in the last column of Tables I and II.

EXAMPLE 68 a. 452 Parts 1,4-di-m-toluidino-6-chloro-anthraquinone are suspended at 100° in 452 parts dimethyl formamide. This suspension is admixed at 100°–110° within 20 minutes, while stirring, with a solution of 102 parts thioglycol and 74 parts potassium hydroxide in 102 parts methanol (= 215 parts by volume of solution), and stirring is continued at the same temperature for 20 minutes. A clear green solution has formed which is poured into 4,000 parts of cold water. The resultant precipitate is filtered off with suction, thoroughly washed with water, and dried. There are obtained 468 parts of 1,4-di-m-toluidino-6-hydroxyethylmercapto-anthraquinone of good quality.

Since under the reaction conditions the solubility of 1,4-di-m-toluidino-6-chloro-anthraquinone in dimethyl-formamide is limited, whereas that of the reaction product is not, it is recommended to react the material in portions in order that the mixture remains stirrable.

b. The 1,4-di-m-toluidino-6-chloro-anthraquinone used in (a) is obtained as follows:

311.5 Parts 1,4,6-trichloro-anthraquinone (crude product, obtained by chlorination of anthraquinone-β-sulphonic acid according to German Pat. No. 216,071 and subsequent treatment with nascent chlorine according to German Pat. No. 214,714) are heated with 1,250 parts m-toluidine and 138 parts sodium carbonate at 180° – 190° for 12 hours, while stirring. The mixture is then diluted with 1,250 parts by volume of methanol, starting at 80°, the reaction product which is precipitated in the form of blue needles is filtered off with suction at 60°, washed with hot methanol until the blue-green drainage liquid is clear, and subsequently thoroughly with hot water. After drying, there are obtained 305 parts 1,4-di-m-toluidino-6-chloro-anthraquinone of good quality.

EXAMPLE 69 a. 487 Parts 1,4-di-m-toluidino-5,8-dichloro-anthraquinone are stirred at 100° – 120° into 487 parts dimethyl formamide. To the suspension which is readily stirrable there is added at 120° – 110° within 15 minutes a solution of 97.5 parts of thioglycol and 70 parts potassium hydroxide in 97.5 parts methanol, and stirring is continued at 110° for 15 minutes.

The mixture is diluted with 480 parts by volume of methanol, stirring is continued for 2 hours while cooling with ice, the product is filtered off with suction and the filtered material is successively washed with 1,000 parts by volume methanol and hot water. After drying, there are obtained 440 parts 1,4-di-m-toluidino-5-hydroxyethyl-mercapto-8-chloro-anthraquinone. This product contains about 10 percent each of 1,4-di-m-toluidino-5,8-dihydroxyethyl-mercapto-anthraquinone and 1,4-di-m-toluidino-5,8-dichloro-anthraquinone as impurities.

The 1,4-di-m-toluidino-5,8-dichloro-anthraquinone used above can be obtained according to one of the following instructions:

b. 200 Parts leuco-5,8-dichloro-quinizarine [obtained from crude 5,8-dichloro-quinizarine (German published specification No. 1,199,279, Example 7)], 600 parts m-toluidine and 2,000 parts by volume ethanol are mixed with a solution of 20 parts boric acid in 60 parts of water and the mixture is boiled under reflux for 6 hours, for the last 4 hours with access of air. The reaction product which is precipitated in the form of blue needles is filtered off with suction while hot, washed with hot ethanol until the blue-green drainage liquid is clear, and finally with hot water. 155.5 Parts are obtained.

c. 225 Parts 5,8-dichloro-quinizarine (obtained according to German published specification No. 1,199,279, Example 7) are dissolved in 1,100 parts by volume of m-toluidine at 85°, 22.5 parts boric acid, 260 parts by volume of concentrated hydrochloric acid and 39 parts of zinc dust are added, and the mixture is stirred at 100° for 2½ hours. The mixture is stirred cold, the product is filtered off with suction, the filtered material is washed with 200 parts m-toluindine and methanol and finally boiled with dilute hydrochloric acid. 175 Parts are obtained.

d. If the 5,8-dichloro-quinizarine is replaced in (c) with a mixture of 165 parts 5,8-dichloro-quinizarine and 60 parts leuco-5,8-dichloro-quinizarine, and only 200 parts by volume of concentrated hydrochloric acid and 30 parts zinc dust are added, then the same reaction and working up yields 213 parts.

EXAMPLE 70 a. 12.9 Parts 1,4-di-anilino-5,8-dibromo-anthraquinone are dissolved in 50 parts dimethyl formamide and the solution is mixed at 90° – 100° with 4.65 parts thioglycol (in the form of a concentrated ethanolic solution potassium salt.) Stirring is continued at 100° – 105° for 25 minutes, the mixture is cooled to 10°, the precipitated dyestuff is filtered off with suction, washed with a little dimethyl formamide, subsequently with hot water, and dried. 8.2 Parts 1,4-di-anilino-5,8- dihydroxyethylmercapto-anthraquinone are obtained.

b. The 1,4-di-anilino-5,8-dibromo-anthraquinone can easily be obtained from 5,8-dibromo-quinizarine by one of the methods described under 69 (b) – (d).

EXAMPLE 71 a. 6.3 Parts 1,4-di-p-anisidino-5-chloro-anthraquinone are dissolved in 30 parts dimethyl formamide and the solution is mixed with 2.05 parts thioglycol (on the form of a concentrated solution of the potassium salt in dimethyl formamide) at 110° – 115°, and stirred at the same temperature for 20 minutes. 15 parts of water are then added dropwise, the product is filtered off with suction and washed with water. After drying, there are obtained 5.05 parts 1,4-di-p-anisidino-5-hydroxyethylmercapto-anthraquinone.

b. The 1,4-di-p-anisidino-5-chloro-anthraquinone used in (a) can be obtained as follows:

84 Parts leuco-5-chloro-quinizarine (obtained from 5-chloro-quinizarine by reduction with aluminum in concentrated sulphuric acid at 55°) are boiled under reflux with 250 parts p-anisidine, 850 parts by volume of ethanol, and 9 parts boric acid (dissolved in 60 parts of water) for 11 hours; stirring is continued for 12 hours without heating, the product is filtered off with suction, and washed with ethanol and water. 109 Parts 1,4-di-p-anisidino-5-chloro-anthraquinone are obtained, which still contains a small amount of the leuco condensation product. The leuco component can easily be oxidized by brief boiling with nitrobenzene or by prolonged heated with pryidine, possibly with the addition of a few drops of piperidine.

EXAMPLE 72

8.5 Parts 1,4-di-m-toluidino-6,7-dichloro-anthraquinone are dissolved in 40 parts dimethyl formamide, 3.6 parts thioglycol in the form of methanolic solution of the potassium salt are added dropwise at 100° – 105° in the course of 20 minutes, and stirring is continued at the same temperature for 20 minutes. The mixture is diluted with 70 parts methanol, the product is filtered off with suction, washed with methanol and hot water. 7.4 Parts 1,4-di-m-toluidino-6,7-dihydroxyethyl-mercapto-anthraquinone are obtained.

b. The 1,4-di-m-toluidino-6,7-dichloro-anthraquinone can be obtained in the following way, for example:

8.5 Parts 1,4,6,7-tetrachloro-anthraquinone (obtainable e.g. by chlorination of 2,3-dichloro-anthraquinone in oleum) are stirred in 42.5 parts m-toluidine with the addition of 5 parts sodium acetate at 180° – 185° for 5 hours. After cooling to 80°, the mixture is diluted with 45 parts ethanol, the precipitated product is filtered off with suction near boiling temperature, and washed with hot ethanol and water. 9.4 Parts 1,4-di-m-toluidino-6,7-dichloro-anthraquinone are obtained.

EXAMPLE 73 a. 9.2 parts of amixture of 1-p-anisidino-4-p-toluidino-6-chloro-anthraquinone and 1-p-anisidino-4-p-toluidino-7-chloro-anthraquinone (obtained according to Section (b) of the present Example) are mixed in 37 parts dimethyl formamide at 80° – 85° with 2.0 parts, i.e. 130 percent of the theory, of thioglycol (in the form of a concentrated methanolic solution of the potassium salt), and stirring is continued at the same temperature for 20 minutes. The mixture is diluted with 50 parts by volume methanol, stirring is continued for 2 hours on an ice bath, the product is filtered off with suction and the filtered material washed with methanol and water.

There are obtained 7.4 parts of a mixture of 1-o-anisidino-4-p-toluidino-6-hydroxyethylmercapto-anthraquinone and 1-o-anisidino-4-p-toluidino-7-hydroxy-ethylmercapto-anthraquinone.

It, instead of the product obtained according to (b), mixtures obtained according to (c), (d), or (e) are used in (a) in the same way, then the same procedure yields products which are somewhat less pure but have the same valuable dyeing properties.

The mixtures used in (a) are obtained as follows:

b. 31.1 Parts of technical 1,4,6-trichloro-anthraquinone, 21.3 parts sodium acetate and 150 parts by volume of p-anisidine are heated with chromatographic control at 170° – 175° until approximately equal amounts of starting material and di-chloro exchange product are present, besides the mono-chloro exchange product (about 30 minutes are required). The mixture is diluted with 150 parts ethanol, stirred cold until the precipitate no longer increases, the latter is filtered off with suction, washed with ethanol and water. There are obtained 23.4 parts of a mixture of 1-o-anisidino-4,6- and -4,7-dichloro-anthraquinone.

20 parts of this mixture are heated with 14 parts sodium acetate and 100 parts p-toluidine at 180° – 185° for 8 hours while stirring. The mixture is diluted with 100 parts diethylene glycol monomethyl ether, the product is filtered off with suction when cold, washed with diethylene glycol monomethyl ether and water. 20.1 Parts are obtained.

Mixtures which are similar but contaminated with the symmetrical chlorine exchange products 1,4-di-o-anisidine-6-chloro-anthraquinone and 1,4-di-p-toluidino-6-chloro-anthraquinone can be obtained by the methods described under (c) – (e).

c. 31.1 Parts 1,4,6-trichloro-anthraquinone are reacted with 90 parts by volume of o-anisidine at 170° – 175° as described in (b), by the reaction is already interrupted when chromatographic control indicates that the starting material and 1,4-di-o-anisidine-6-chloro-anthraquinone are present in a ratio of 2:1. 120 Parts p-toluidine are then added, the mixture is heated at 180° until only small amounts of monoarylamino reaction products can be detected, and worked up as described under (b).

d. 31.1 Parts 1,4,6-trichloro-anthraquinone is stirred with a mixture of 100 parts o-anisidine and 50 – 25 parts p-toluidine with the addition of 20 parts sodium acetate at 180° for 12 hours and worked up as described under (b).

e. 85 Parts leuco-6-quinizarine are boiled under reflux for 15 hours with 250 parts of a mixture of o-anisidine and p-toluidine in a ratio of 2;1– 3:1, 850 parts by volume of ethanol, and a solution of 9 parts boric acid in 60 parts of water, air having access for the last 10 hours. The mixture is stirred cold, the precipitated reaction product is filtered off with suction and successively washed with ethanol and water.

EXAMPLE 74 a. 10 Parts 1,4-di-m-toluidino-6-chloro-anthraquinone are dissolved in 40 parts dimethyl formamide, and the solution is mixed within 30 minutes at 105° with a warm solution of 3.8 parts thioglycerol and 2.0 parts potassium hydroxide in 5 parts ethanol. The mixture is diluted with 75 parts ethanol, stirring is continued for several hours with cooling, the product is filtered off with suction, washed with ethanol and water.

After drying, there are obtained 7.8 parts 1,4-di-m-toluidino-6-dihydroxyethylmercapto-anthraquinone.

The reaction products B of Table 1 can be obtained by one of methods described in Examples 68(a) – 73(a) from the starting materials a of Table 1 by reaction with thioglycol. The figures in brackets refer to the substitution positions on the anthraquinone nucleus. The shades given in the last column refer to polyamide dyeings obtained according to the instruction of Example 131.

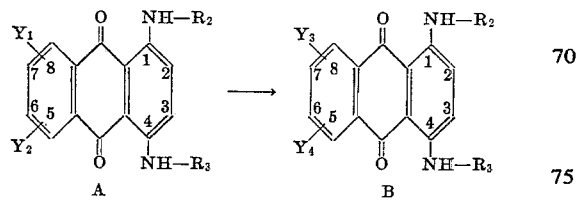

TABLE 1

| Example | A | | | | | B | | | | |
|---|---|---|---|---|---|---|---|---|---|---|
| | $R_2$ | $R_3$ | $Y_1$ | $Y_2$ | | $R_2$ | $R_3$ | $Y_3$ | $Y_4$ | Shade |
| 75 | -C₆H₄-OCH₃ | -C₆H₄-OCH₃ | Cl (6) | H | | -C₆H₄-OCH₃ | -C₆H₄-OCH₃ | -S-CH₂-CH₂-OH (6) | H | Yellow-green. |
| 76 | Same as above | Same as above | Cl (5) | H | | Same as above | Same as above | -S-CH₂-CH₂-OH (5) | H | Yellowish green. |
| 77 | do | do | Cl (5) | Cl (8) | | do | do | -S-CH₂-CH₂-OH (5) | Cl (8) | Yellowish-green. |
| 78 | do | do | Cl (6) | Cl (7) | | do | do | -S-CH₂-CH₂-OH (6) | -S-CH₂-CH₂-OH (7) | Yellowish green |
| 79 | do | do | Cl (6) | Cl (7) | | do | do | -S-CH₂-CH₂-OH (6) | Cl (7) | Yellowish green. |
| 80 | do | do | Cl (5) | Cl (8) | | do | do | -S-CH₂-CH₂-OH (5) | -S-CH₂-CH₂-OH (8) | Yellowish green. |
| 81 | do | do | Br (5) | Br (8) | | do | do | -S-CH₂-CH₂-OH (5) | Br (8) | Yellowish-green. |
| 82 | -C₆H₄-OCH₃ | -C₆H₄-OCH₃ | Cl (6) | H | | -C₆H₄-OCH₃ | -C₆H₄-OCH₃ | -S-CH₂-CH₂-OH (6) | H | Yellowish green. |
| 83 | -C₆H₅ | -C₆H₅ | Cl (6) | H | | -C₆H₅ | -C₆H₅ | -S-CH₂-CH₂-OH (6) | H | Green. |
| 84 | Same | Same | Cl (5) | Cl (7) | | Same | Same | -S-CH₂-CH₂-OH (5) | Cl (7) | Do. |
| 85 | do | do | Cl (5) | Cl (8) | | do | do | -S-CH₂-CH₂-OH (5) | Cl (8) | Do. |
| 86 | -C₆H₄-CH₃ | -C₆H₄-CH₃ | Cl (6) | H | | -C₆H₄-CH₃ | -C₆H₄-CH₃ | -S-CH₂-CH₂-OH (6) | H | Blue-green. |

TABLE 1—Continued

| Example | A R2 | A R3 | A Y1 | A | B Y2 | B R2 | B R3 | B Y3 | B Y1 | Shade |
|---|---|---|---|---|---|---|---|---|---|---|
| 87 | ⌬CH₃ | ⌬CH₃ | Cl (5) | H | ⌬CH₃ | ⌬CH₃ | —S—CH₂—CH₂—OH (6) | H | Bluish green. |
| 88 | Same | Same | Cl (6) | Cl (7) | Same | Same | —S—CH₂—CH₂—OH (6) | Cl (7) | Green. |
| 89 | ⌬CH₃ | ⌬CH₃ | Cl (6) | H | ⌬CH₃ | ⌬CH₃ | —S—CH₂—CH₂—OH (6) | H | Do. |
| 90 | Same | Same | Cl (6) | H | Same | Same | —S—CH₂—CH₂—OH (6) | H | Blue-green. |
| 91 | do | do | Cl (5) | Cl (8) | do | do | —S—CH₂—CH₂—OH (5) | Cl (8) | Bluish-green. |
| 92 | ⌬Cl | ⌬Cl | Cl (6) | H | ⌬Cl | ⌬Cl | —S—CH₂—CH₂—CH (6) | H | Greenish blue. |
| 93 | ⌬F | ⌬F | Cl (6) | H | ⌬F | ⌬F | —S—CH₂—CH₂—CH (6) | H | Do. |
| 94 | ⌬OC₂H₅ | ⌬OC₂H₅ | Cl (5) | H | ⌬OC₂H₅ | ⌬OC₂H₅ | —S—CH₂—CH₂—CH (5) | H | Green. |
| 95 | ⌬OC₂H₅ | ⌬OC₂H₅ | Cl (6) | Cl (7) | ⌬OC₂H₅ | ⌬OC₂H₅ | —S—CH₂—CH₂—CH (6) | Cl (7) | Do. |
| 96 | ⌬NH₂ | ⌬NH₂ | Cl (5) | H | ⌬NH₂ | ⌬NH₂ | —S—CH₂—CH₂—OH (5) | H | Bluish green. |
| 97 | ⌬NH—CO—CH₃ | ⌬NH—CO—CH₃ | Cl (6) | H | ⌬NH—CO—CH₃ | ⌬NH—CO—CH₃ | —S—CH₂—CH₂—OH (6) | H | Green. |
| 98 | Same as above | Same as above | Cl (5) | Cl (8) | Same as above | Same as above | —S—CH₂—CH₂—OH (5) | Cl (8) | Bluish green. |
| 99 | ⌬NH—CO—CH₂—OH | ⌬NH—CO—CH₂—OH | Cl (6) | H | ⌬NH—CO—CH₂—OH | ⌬NH—CO—CH₂—OH | —S—CH₂—CH₂—OH (6) | H | Green. |
| 100 | ⌬OH | ⌬OH | Cl (6) | H | ⌬OH | ⌬OH | —S—CH₂—CH₂—OH (6) | H | Do. |
| 101 | ⌬OH | ⌬OH | Cl (6) | Cl (8) | ⌬OH | ⌬OH | —S—CH₂—CH₂—OH (5) | Cl (8) | Green. |

TABLE 1—Continued

| Example | A | | | | B | | Shade |
|---|---|---|---|---|---|---|---|
| | $R_2$ | $R_3$ | $Y_1$ | $Y_2$ | $R_2$ $R_3$ | $Y_3$ $Y_4$ | |
| 102 | –NH–CH$_2$–CH$_2$–OH (phenyl) | –NH–CH$_2$–CH$_2$–OH (phenyl) | Cl (6) | H | –NH–CH$_2$–CH$_2$–OH (phenyl) / –NH–CH$_2$–CH$_2$–OH (phenyl) | –S–CH$_2$–CH$_2$–OH (6) / H | Do. |
| 103 | –O–CH$_2$–CH$_2$–OH (phenyl) | –O–CH$_2$–CH$_2$–OH (phenyl) | Cl (6) | H | –O–CH$_2$–CH$_2$–OH (phenyl) / –O–CH$_2$–CH$_2$–OH (phenyl) | –S–CH$_2$–CH$_2$–OH (6) / H | Do. |
| 104 | –COOCH$_3$ (phenyl) | –COOCH$_3$ (phenyl) | Cl (6) | H | –COOCH$_3$ (phenyl) / –COOCH$_3$ (phenyl) | –S–CH$_2$–CH$_2$–OH (6) / H | Do. |
| 105 | –OCH$_3$, OCH$_3$ (phenyl) | –OCH$_3$ (phenyl) | Cl (6) | H | –OCH$_3$, OCH$_3$ (phenyl) / –OCH$_3$ (phenyl) | –S–CH$_2$–CH$_2$–OH (6) / H | Yellowish green. |
| 106 | Same | | Cl (6) | Same | | –S–CH$_2$–CH$_2$–OH (6) / H | Green. |
| 107 | ...do... | | Cl (6) | ...do... | | –S–CH$_2$–CH$_2$–OH (6) / H | Yellowish green. |
| 108 | –OCH$_3$ (phenyl) | (phenyl) | Cl (6) | H | –OCH$_3$ (phenyl) / (phenyl) | –S–CH$_2$–CH$_2$–OH (6) / H | Green. |
| 109 | –CH$_3$ (phenyl) | –CH$_3$ (phenyl) | Cl (5) | H | –CH$_3$ (phenyl) / –CH$_3$ (phenyl) | –S–CH$_2$–CH$_2$–OH (5) / H | Blue-green. |
| 110 | –C(CH$_3$)$_2$–CH$_3$ (phenyl) | (phenyl) | Cl (6) | H | –C(CH$_3$)$_2$–CH$_3$ (phenyl) / –OCH$_3$ (phenyl) | –S–CH$_2$–CH$_2$–OH (6) / H | Bluish green. |
| 111 | –NH–CO–CH$_3$ (phenyl) | –CH$_3$ (phenyl) | Cl (6) | H | –NH–CO–CH$_3$ (phenyl) / –CH$_3$ (phenyl) | –S–CH$_2$–CH$_2$–OH (6) / H | Green. |
| 112 | –OCH$_3$, CH$_3$ (phenyl) | –CH$_3$ (phenyl) | Cl (6) | Cl (7) | –OCH$_3$, CH$_3$ (phenyl) / –CH$_3$ (phenyl) | –S–CH$_2$–CH$_2$–OH (6) / Cl (7) | |
| 113 | CH$_3$, CH$_3$ (phenyl) | CH$_3$, CH$_3$ (phenyl) | Cl (6) | H | CH$_3$, CH$_3$ (phenyl) / CH$_3$, CH$_3$ (phenyl) | –S–CH$_2$–CH$_2$–OH (6) / H | Blue. |

TABLE 1—Continued

| Example | A | | | | B | | | Shade |
|---|---|---|---|---|---|---|---|---|
| | $R_2$ | $R_3$ | $Y_1$ | $Y_2$ | $R_2$ | $R_3$ | $Y_3$ | $Y_4$ | |
| 114 | (2,3-dimethylphenyl) | (2,3-dimethylphenyl) | Cl(6) | H | (2,3-dimethylphenyl) | (2,3-dimethylphenyl) | —S—CH$_2$—CH$_2$—OH (6) | H | Blue-green |
| 115 | (2,4,6-trimethylphenyl) | (2,4,6-trimethylphenyl) | Cl(6) | H | (2,4,6-trimethylphenyl) | (2,4,6-trimethylphenyl) | S—CH$_2$—CH$_2$—CH (6) | H | Blue |
| 116 | (2-hydroxy-3-methylphenyl) | (2-hydroxy-3-methylphenyl) | Cl(6) | Cl(7) | (2-hydroxy-3-methylphenyl) | (2-hydroxy-3-methylphenyl) | S—CH$_2$—CH$_2$—CH (6) | Cl(7) | Green |
| 117 | (2,3-dimethoxyphenyl) | (2,3-dimethoxyphenyl) | Cl(5) | Cl(8) | (2,3-dimethoxyphenyl) | (2,3-dimethoxyphenyl) | S—CH$_2$—CH$_2$—CH (5) | Cl(8) | Do. |
| 118 | (2-chloro-3-methylphenyl with NH—CO—CH$_3$) | (2-chloro-3-methylphenyl) | Cl(6) | H | (2-chloro-3-methylphenyl with NH—CO—CH$_3$) | (2-chloro-3-methylphenyl) | S—CH$_2$—CH$_2$—CH (6) | H | Do. |
| 119 | (4-tert-butylphenyl) | (4-tert-butylphenyl) | Cl(6) | Cl(7) | (4-tert-butylphenyl) | (4-tert-butylphenyl) | S—CH$_2$—CH$_2$—CH$_2$OH (6) OH | —S—CH$_2$—CH$_2$OH (7) | Bluish green |
| 119a | (3-methylphenyl) | (3-methylphenyl) | S—CH$_2$HCOH CH$_2$OH | Cl(8) | (3-methylphenyl) | (3-methylphenyl) | S—CH$_2$—CH—CH$_2$OH OH | —S—CH$_2$—CH$_2$—OH | |

The reaction products B of Table 2 can be obtained by the method described in Example 5 from the starting compounds A by reaction with thioglycerol. The figures in brackets refer to the substitution positions in the anthraquinone molecule. The shades given in the last column refer to polyamide dyeings obtained according to the instruction of Example 131.
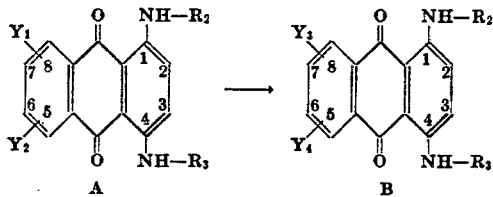

EXAMPLE 131 a. 10 Parts by weight of a fabric of synthetic polyamide in a bath containing 400 parts of water 0.2 parts 1,4-di-m-toluidino-6-hydroxyethylmercapto-anthraquinone (obtained according to Example 1) in finely divided form and 0.2 parts of a conventional dispersing agent, are slowly heated to boiling temperature and dyed at the boil for 1 hour. The material is subsequently rinsed, slightly soaped, if desired, and dried. A deep green dyeing of very good fastness to washing, light and rubbing is obtained.

EXAMPLE 132

A printing paste is prepared from 10 parts 1,4-di-m-toluidino-6-hydroxyethylmercapto-anthraquinone (in finely divided form), 30 parts Glyecin A — thiodiethylene glycol, 50 parts urea, 500 parts of a 12 percent carob bean flour ether thickening, and made up to 1,000 parts with water.

This paste is applied to a fabric of synthetic polyamide according to known processes by machine or screen printing, the fabric is dried and steamed in a Mather-Platt apparatus at 102° for 10 minutes, and subsequently rinsed and soaped in the usual way. A green print of very good fastness to washing, light and rubbing is obtained.

EXAMPLE 133

If the 1,4-di-m-toluidino-6-hydroxyethylmercapto-anthraquinone is replaced in Example 131 or 132 with the same amounts of dyestuffs obtained in Examples 69 – 74, then the dyestuff of Example 69($a$) yields yellowish green, that of 70($a$) yields bluish-green, those of 71 – 74($a$) yield green dyeings or prints of good to very good fastness properties.

If the 1,4-di-m-toluidino-6-hydroxyethylmercapto-anthraquinone is replaced in Examples 131 or 132 with the same amounts of the dyestuffs of the Tables 1 and 2, then dyeings or prints are obtained in the shades given in the last column of these Tables.

What is claimed is:

1. The dyestuff of the formula

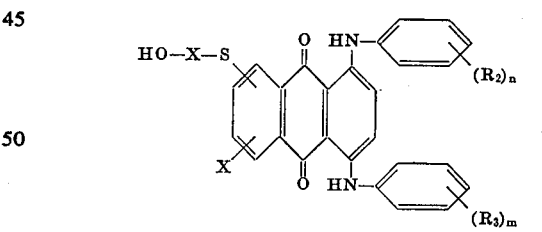

in which $R_2$ and $R_3$ are selected from the group consisting of hydrogen, alkyl of one to six carbon atoms, hydroxyalkyl with one to six carbon atoms, alkoxy with one to four carbon atoms, hydroxyalkoxy with one to four carbon atoms, methoxyalkoxy with one to four carbon atoms in the alkyl radical, alkyl mercapto with one to four carbon atoms, fluoro, chloro, bromo, amino, methylamino, dimethylamino, cyclo-hexylamino, acetylamino, propionylamino, butyrylamino, acetyl-methylamino, hydroxy-ethylamino, hydroxyacetylamino, methoxy-acetylamino, and hydroxy; chloroacetyl-amino, methylacetylamino, cyclohexyl, acetaminophenyl, carbomethoxy and carbo-ethoxy;

X is an alkylene radical or an alkylene radical substituted on OH wherein alkylene means a member selected from the group $C_{1-6}$ straight-chain alkylene and $C_{1-6}$ branched chain alkylene;

Y is H, Cl, Br, or a radical —S—X—OH; wherein the anthraquinone nucleus may contain further Cl or Br substituents wherein $n$ and $m$ *stand for a number from* 0–3.

2. Dyestuffs claim 1 of the formula
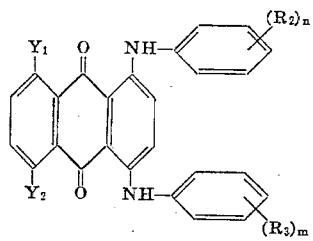
in which $Y_1$ and $Y_2$ stand for hydrogen, chlorine, bromine of —S—X—chlorine or bromine.
3. Dyestuffs of claim 1 of the formula
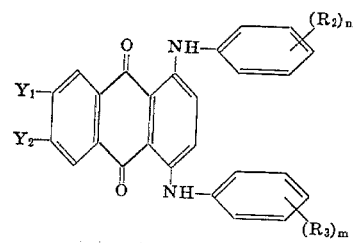
in which $Y_1$ and $Y_2$ stand for hydrogen, chlorine, bromine or —S—X—OH but cannot simultaneously denote hydrogen, chlorine or bromine.
* * * * *

UNITED STATES PATENT OFFICE
CERTIFICATE OF CORRECTION

Patent No. 3,666,778          Dated May 30, 1972

Inventor(s) Walter Hohmann et al

It is certified that error appears in the above-identified patent and that said Letters Patent are hereby corrected as shown below:

Column 5, line 37, "triethylamine" should read ---triethanolamine---.

Column 6, line 29, "form" should read ---from---.

Column 6, line 46, the comma should be a period.

Column 7, line 7, "25,2" should read ---25.2---.

Column 7, line 14, "anthraquininone" should read ---anthraquinone---.

Column 7, line 16, "anthraquninone" should read ---anthraquinone---.

Column 8, line 6, "was" should read ---washed with ---.

Column 9, line 3, "a" should read ---acid---.

Column 12, Example 28 - Table I, "-S-CH$_2$-CH$_2$IOH" should read ---S-CH$_2$-CH$_2$-OH---.

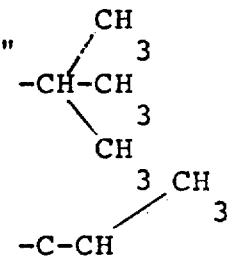

Column 13, Example 34, Table I, should read in all four instances.

UNITED STATES PATENT OFFICE
CERTIFICATE OF CORRECTION

Page 2

Patent No. 3,666,778                Dated May 30, 1972

Inventor(s) Walter Hohmann et al

It is certified that error appears in the above-identified patent and that said Letters Patent are hereby corrected as shown below:

Column 22, line 26, "(a)" should be inserted before "8.5 Parts"

Column 23, line 16, "anisidine" should read ---anisidino---.

Column 23, line 25, "anisidine" should read --anisidino---.

Column 23, line 36, "2;1" should read ---2:1---.

Column 23, line 57, "dihydroxyethyl-mercapto-" should read ---"dihydroxypropyl-mercapto- ---.

Column 23, line 61, after the word "of" insert ---the---.

Column 23, line 62, "a" should read ---A---.

Column 31, line 2, "5" should read ---74---.

Column 32, Example 126, Table 2, "Blue" should read ---blue-green---.

Column 34, Claim 1, in the formula, "X/" should read ---Y/---.

Column 34, Claim 1, line 69, "on" should read ---by---.

Column 35, Claim 2, line 1, the word "of" should be inserted after "Dyestuffs".

Column 35, Claim 2, lines 14 and 15, "of-S-X-" should read ---or -S-X-OH but cannot simultaneously denote hydrogen,---.

Signed and sealed this 3rd day of December 1974.

(SEAL)
Attest:

McCOY M. GIBSON JR.
Attesting Officer

C. MARSHALL DANN
Commissioner of Patents

ORM PO-1050 (10-69)